July 10, 1934.　　　　J. G. JACKSON　　　　1,965,647
REENFORCED BAKING PAN
Filed May 30, 1930
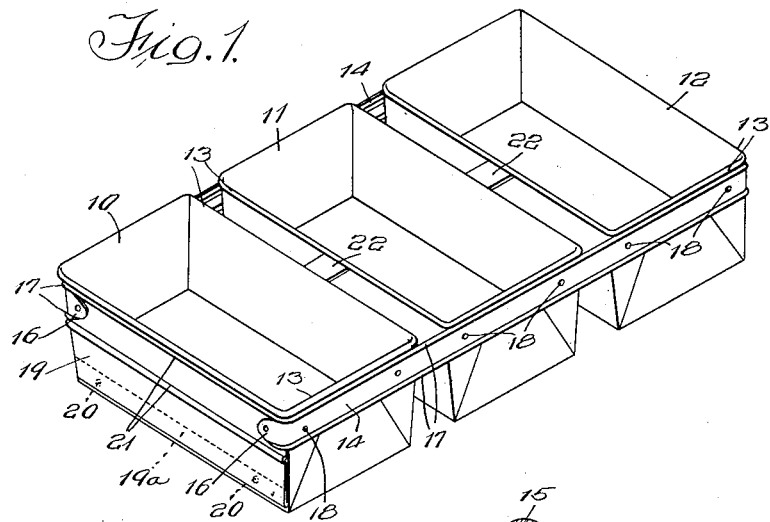
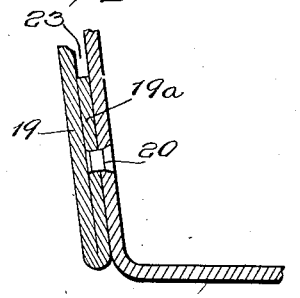
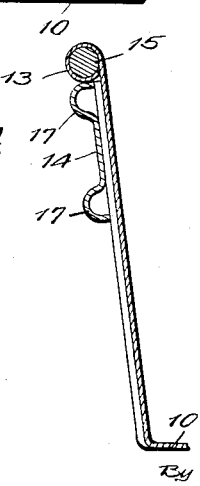
Witness:
William P. Kilroy
Inventor,
Joseph G. Jackson
By Charles V. Wilson
Atty Patented July 10, 1934

1,965,647

UNITED STATES PATENT OFFICE 1,965,647

REENFORCED BAKING PAN

Joseph G. Jackson, Oak Park, Ill., assignor to Edward Katzinger Company, Chicago, Ill., a corporation of Illinois Application May 30, 1930, Serial No. 457,622

9 Claims. (Cl. 53—6)

This invention relates generally to baking pan sets and particularly to the strap and protection plate construction thereof and has for its object the elimination of exposed or projecting rivets or attaching devices, the general increase of the strength of the set, and the general protection of the pan units making up the set.

With the above and other objects in view, as will be apparent, this invention consists in the construction, combination and arrangement of parts all as hereinafter more fully claimed, described and illustrated in the accompanying drawing wherein:

Fig. 1 is a perspective view of a multiple pan set embodying the present invention;

Fig. 2 is a detailed sectional view through one end of the pan set, illustrating the protection plate in full lines and in dotted lines the position thereof prior to being fixed to the side wall of the end pan;

Fig. 3 is an enlarged fragmentary vertical sectional view of a pan wall and cooperating protection plate illustrating the attachment of the latter to the former; and Fig. 4 is a vertical section through the end of one pan of the set and the cooperating strap.

It is well known that baking pans or receptacles are subjected to extraordinary wear incident to the use thereof. Baking pans have therefore been provided with straps, reenforcing means and protection plates to resist this hard usage. However, the construction of reinforced baking pans, as heretofore used, has been such that in grouping or nesting the pans while not in service, projecting parts employed in the construction and arrangement of the protection plates when in contact with and rubbing against the walls of an adjoining pan, produced discolorations on the surface of the inner walls of said adjoining pan. Accordingly, the dough, when placed in the pan would consequently come in contact with the discolored portions on the inner surface of the pan, and after the baking operation was completed, the baked article would bear a corresponding dark spot on its surface.

The present invention is designed primarily to protect and reinforce the walls of said pans and at the same time provide facilities for properly nesting the pans when not in actual service without scraping or otherwise injuring the inner surface of the pan walls.

It furthermore contemplates a multiple pan set that will have the elements thereof strongly and rigidly connected one to the other, whereby the alignment thereof is maintained and it is also designed to provide ample protection for all exposed surfaces of the pans making up the pan sets and to provide means for receiving all shocks and bumps.

While the present invention is of general application and use in connection with baking pans, it is particularly applicable to pan sets such as illustrated in Fig. 1 of the drawing.

Reference being had more particularly to the drawing, 10, 11 and 12 designate the respective pans of a pan set, each of standard design and construction, bound or secured together in aligned and spaced relation by means of the straps 14, one of which coacts with and extends across the aligned ends of the said pans. While the drawing illustrates a unitary assembly of three baking pans, comprising two end pans 10 and 12 and an intermediate pan 11, it will be apparent that fewer or greater numbers of pans may be included in the assembly if desired.

Each of the pans 10, 11 and 12 is provided with an outstanding peripheral bead 13, containing a reenforcing wire 15, in the usual manner. Each strap 14 comprises a strip of sheet metal or other suitable material of such length that it is adapted to embrace the full extension of the corresponding and coplanar end walls of the pans 10, 11 and 12 in the arrangement shown in Fig. 1, and having an ear or overlapping portion 16 at each of its ends which may be bent at substantially right angles to the main portion of the strap 14 to coincide with and rest against the outer walls of the end pans 10,-12. Longitudinal beads or corrugations 17 are formed along the top and bottom edges of the said strap 14, the bead 17 at the upper edge being arranged to rest firmly adjoining the bead 13 of the pans 10, 11 and 12. These projections or beads 17 along the upper edges of the strap 14 extend beyond the outer limits of the adjoining beads 13 of the pan ends and protect the beads 13 as well as the pan ends, from shocks, bumps or jars which might otherwise damage said beads and ends. The lower bead or projection 17 may also serve to limit the nesting action of packed pan sets. Each strap 14 is fastened securely to the corresponding coplanar end walls of the pan elements 10, 11 and 12 by rivets 18 passing through the strap and having the heads thereof positioned between the V-shaped folds which lie flat against the end wall of the pans, whereby no parts of the rivets 18 are exposed inside the pans to contact with the contents thereof. Of course, if seamless pans are used to make up the set the rivets 18 may pass through the end of the pan, in which event they will appear upon the interior thereof.

Secured to the outer side wall of each of the end pans 10 and 12 is a protection plate 19, comprising a sheet of metal or other suitable reenforcing material, conforming in dimensions with and disposed within the confines of the rectangle defined by the limits of the said side wall.

The fastening of the lower edge of the protection plate 19 to the end pan 10 involves an arrangement wherein the plate 19 is inverted with respect to its normal position when the assembly is completed, and except for a margin or portion 19a resting flush against the outer pan wall, the plate extends beyond the plane of the bottom of the pan, as illustrated in dotted lines in Fig. 2. After rivets 20, or the like, have been passed through the said marginal portion 19a of the protection plate and thence through the adjacent side wall of the pan, the plate 19 is folded back upon itself to rest substantially parallel to the said marginal portion 19a, whereby the head of the rivet 20 is contained within the fold thus obtained. The other end of the rivet 20 protruding through the side wall of the pan is treated in the usual manner. It will be observed from Fig. 2 that a V-shaped space 23 is defined by the wall of the pan, the unexposed side of the plate 19 and the extreme edge of the folded portion therebetween.

Parallel outstanding beads 21 are also formed in the plate 19 which correspond to and are adapted to form a general continuation of the beads or projections 17 of the strap 14. The upper edge or extremity of the protection plate 19 is folded into the bead 13 and reenforcing wire 15 to securely hold the same in rigid assembly.

To further strengthen the retaining qualities of the reenforcing frame comprising the bars 14 and plate 19, dividers or spacing members 22 are provided between the adjoining pan elements 10, 11, 12 and the peripheries thereof. The dividers 22 usually comprise a section of metal or similar material having two opposed edges thereof adapted to be engaged by the bead 13 and wire reenforcing member 15 of the adjoining pan walls. The design and construction of the dividers 22 may be of any desired kind consistent with the provisions of sufficient space between the pan elements 10, 11 and 12 for proper movement of air and resulting distribution of heat to all parts of the enclosed pan wall surfaces.

From the foregoing it will be noted that a reenforced baking pan set is provided wherein the exposure of all projecting parts such as rivet heads and the like which are usually so situated as to come in contact with the interior walls of adjoining pans when placed in nested relation, is eliminated.

It is also manifest that protection plates are provided on the side walls of the end pans, having a double thickness at the point of greatest wear or shock, and at the same time both edges of the plate are rigidly secured to the pan wall without any protruding fastening means. The cross sectional construction of the strap 14 is such that it has greater strength and so protects the rivet heads that they will not contact with adjoining pans in sliding into and out of ovens.

What is claimed is:

1. In a baking pan set, each pan thereof having a bead at its edges, the combination with a protection plate comprising a sheet of metal substantially coextensive with and disposed flatly against the outer side wall of each of the end pans, having a portion at one edge thereof folded upon itself and positioned between the plate and the pan wall and the opposite edge retained by the pan bead, and a rivet piercing said folded portion and the pan wall for securing said plate in position the outer end of said rivet being covered by the body of the plate.

2. The combination with a plurality of baking pans, means for connecting said pans in fixed alignment comprising a strap secured to the aligned ends of said pans, beads formed in said strap along the top and bottom edges thereof, a protection plate secured to the outer side wall of each of the end pans, outstanding beads formed in said plate corresponding to and adapted to form a continuation of the beads of the strap, and means unexposed to the exterior of the pan for securing said protection plate to its coacting pan.

3. The combination with a plurality of baking pans, means for connecting said pans in fixed alignment comprising a strap secured to the aligned ends of said pans, beads formed in said strap along the top and bottom edges thereof, a protection plate comprising a sheet of metal substantially coextensive with and disposed flatly against the outer side wall of each of the end pans, outstanding beads formed in said plate corresponding to and adapted to form a continuation of the beads of the strap, and means unexposed to the exterior of the pan for securing said protection plate to its coacting pan.

4. The combination with a plurality of baking pans, a strap secured to the aligned ends of said pans, a pair of beads formed along the top and bottom edges of said strap, means positioned intermediate said pair of beads for fastening said strap to said pan ends, a protection plate secured to the outer side wall of each of the end pans, beads formed in said plate corresponding to and adapted to form a continuation of the beads of said strap, and means unexposed to the exterior of the pan for securing said protection plate in place.

5. The combination with a plurality of baking pans, a bead formed in the top edge of each of said pans, a strap secured to the aligned ends of said pans, means formed integrally therewith for protecting the bead of said pan, means for securing said strap to said pan ends, a protection plate secured to the outer side wall of each of the end pans and having its upper edge engaged by the adjoining pan bead, beads formed in said plate corresponding to and adapted to form a substantial continuation of the protecting means of said strap, and means unexposed to the exterior of the pan for securing the lower portion of the protection plate to the coacting pan.

6. In a baking pan set the combination with a plurality of alined pans, of a protection plate cooperating with the exposed side walls of the end pans having projecting beads thereon, and straps coacting with the ends of said pans for maintaining the alinement thereof, provided with projecting beads forming approximate continuations of the beads aforesaid on said protection plate and having their ends bent to overlap said plate.

7. In a baking pan set the combination with a plurality of alined pans, of a protection plate cooperating with the exposed side walls of the end pans having projecting beads thereon, and straps coacting with the ends of said pans for maintaining the alinement thereof, provided with projecting beads forming approximate continuations of the beads aforesaid on said protection plate and having their ends bent to overlap said plate between the beads thereof.

8. The combination with a baking pan provided with a bead at the upper edges of the walls thereof, of a protection plate co-extensive with the pan wall, having its upper edge engaged by the pan bead aforesaid and the lower portion thereof rebent to rest between the pan wall and the body of the plate, and a rivet piercing said rebent portion and the pan wall and covered by the plate.

9. The combination with a baking pan, of a protection plate coextensive and coacting with a wall thereof, having a margin portion at its lower edge adjoining the pan bottom rebent upwardly to rest between the body of the plate and the adjacent wall of the pan, and a rivet piercing said margin portion and the pan wall and covered by the body of said plate.

JOSEPH G. JACKSON.